United States Patent [19]
Aoshima et al.

[11] Patent Number: 5,357,532
[45] Date of Patent: Oct. 18, 1994

[54] WAVELENGTH VARIABLE LASER DEVICE

[75] Inventors: Shinichiro Aoshima; Haruyasu Ito, both of Hamamatsu, Japan

[73] Assignee: Hamamatsu Photonics K.K., Hamamatsu, Japan

[21] Appl. No.: 15,436

[22] Filed: Feb. 9, 1993

[30] Foreign Application Priority Data

Feb. 10, 1992 [JP] Japan .................................. 4-023913

[51] Int. Cl.$^5$ ............................................. H01S 3/10
[52] U.S. Cl. ...................... 372/20; 372/29;
372/31; 372/32; 372/25; 372/93; 372/94;
372/69; 372/71
[58] Field of Search ................ 372/20, 29, 18, 31,
372/32, 25, 93, 94, 69, 71

[56] References Cited

U.S. PATENT DOCUMENTS 4,707,835  11/1987  Mocker ................................. 372/20

FOREIGN PATENT DOCUMENTS 0457523  11/1991  European Pat. Off. .
WO9105385  4/1991  PCT Int'l Appl. .

OTHER PUBLICATIONS

IBM Technical Disclosure Bulletin, "Interferometric Dye Laser Wavelength Tuner", Zory, vol. 14, No. 3, Aug. 1971, p. 951.
Mitschke et al., "Stabilizing the Soiton Laser", 8106 I.E.E.E., Journal of Quantum Electronics, vol. QE-22, No. 12, Dec. 1986, pp. 2242–2250.

*Primary Examiner*—Georgia Y. Epps
*Attorney, Agent, or Firm*—Cushman, Darby & Cushman

[57] ABSTRACT

To provide a wavelength tunable laser device having a wavelength variable range of a broad band, and capable of simply changing the output wavelength. Excitation means 1 excites a laser medium 2a in a main resonator 2. The main resonator 2 is provided with two resonator mirrors 2b and an optical input/output port 2c in addition to the laser medium 2a. By the excitation means 1 and the main resonator 2, laser oscillation can be produced. A sub-resonator 3 is provided with wavelength selection means 3a and optical feedback means 3b. And, the sub-resonater selects a desired wavelength of the laser beam outputted from said main resonator and returns the laser beam of the desired wavelength back to said laser medium. In a device comprising the excitation means 1, the main resonator 2 and the sub-resonator 3, an optical output port 4 is provided. Since this wavelength tunable laser device has no necessity of providing wavelength selection means within the main resonator, laser oscillation is easily produced. Accordingly, even in the case where the gain of the laser medium is small, or the excitation energy is small, oscillation can be produced. In addition, since the main resonator can be placed in an oscillating state at all times, the wavelength tunable laser device can be prevented from being stopped.

40 Claims, 17 Drawing Sheets

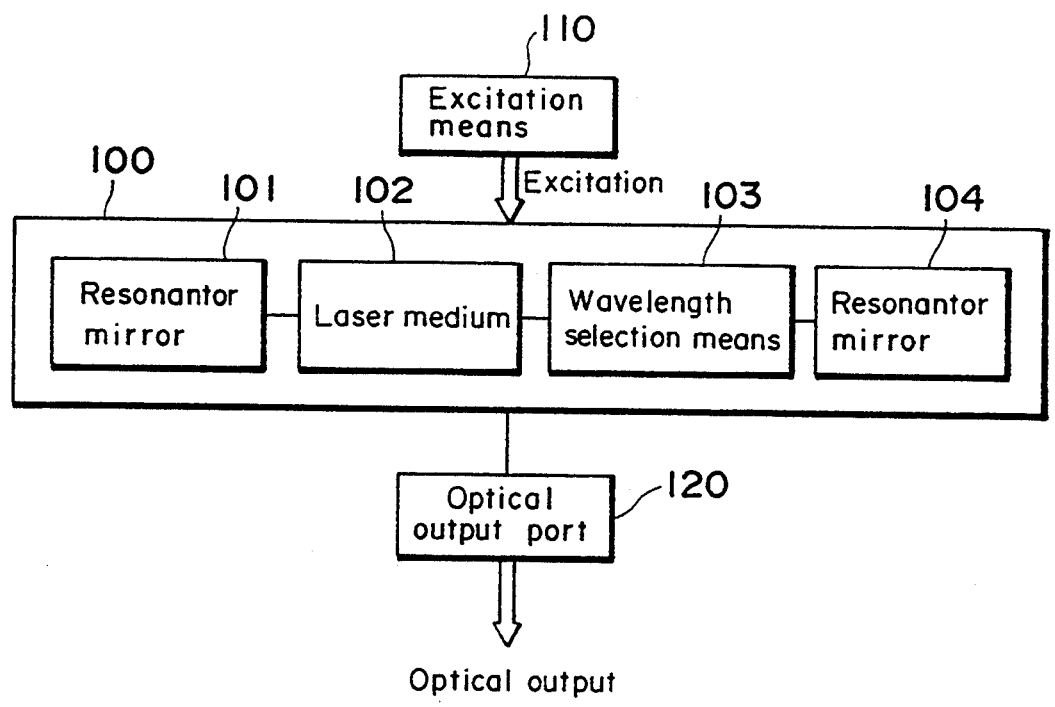
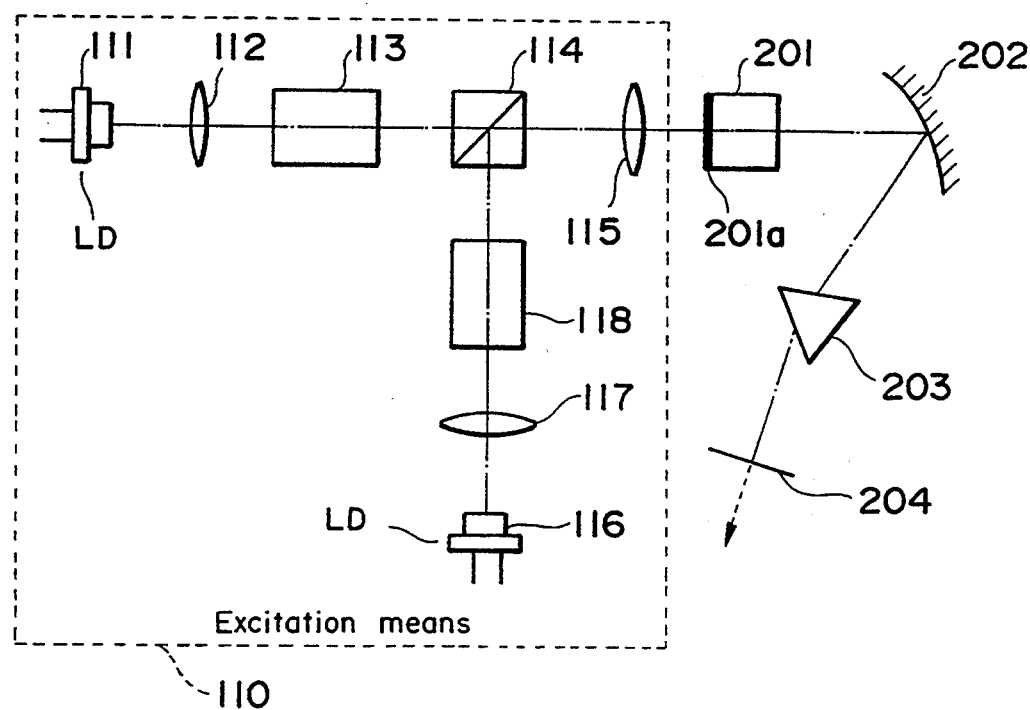

WAVELENGTH VARIABLE LASER DEVICE

BACKGROUND OF THE INVENTION

1. Field of the invention

This invention relates to a wavelength tunable laser device.

2Related Background Art

A block diagram of the representative fundamental configuration of a conventional wavelength tunable laser device is shown in FIG. 1. A resonator 100 is composed of two resonator mirrors 101, 104, and a laser medium 102 and wavelength selection means 103 put therebetween. The laser medium 102 is excited by excitation means 110, and laser resonance is produced by the two resonator mirrors 101, 104. The laser resonance wavelength is determined by the wavelength selection means 103, and is outputted to the external via an optical output port 120.

FIG. 2 shows an example of an actual configuration corresponding to the block diagram of FIG. 1. The excitation means 110 is constituted as follows. A laser diode 111, a collimating leans 112, an anamorphic prism pair 113, a polarization beam splitter 114, and a focusing lens 115 are provided in order on the optical axis of the laser diode 111. Further, a laser diode 116, a collimating lens 117 and an anamorphic prism pair 118 are provided in order on the optical axis of the laser diode 116 perpendicular to the optical axis of the previously described laser diode 111. In addition, the previously described polarization beam splitter 114 is provided on the optical axis of the laser diode 116.

A laser beam from the excitation means 110, i.e., a laser beam from the focusing lens 115 is incident to a laser medium 201 having a resonator mirror 201a on its incident plane, and is reflected on a concave mirror 202. Thereafter, the laser beam thus reflected is passed through a prism 203, and is incident to a plane mirror 204 of an output port doubling as a resonator mirror.

As shown, wavelength selection means is arranged on an optical path between the resonator mirror 201a and the plane mirror 204 serving as a pair of laser resonator mirrors. In order to vary the wavelength of an output light in such a device, the prism 203 was rotated, or the plane mirror 204 of the output port doubling as a resonator mirror was rotated.

However, with such a conventional device, it is difficult to generate laser resonance because the wavelength selection means is provided within the resonator. Moreover, there are instances where when the gain of the laser medium is small, or the excitation energy is small, it is difficult to perform laser oscillation.

Further, the prism is rotated to change the wavelength of an output light, but when the rotation angle of the prism 203 is over a predetermined range, oscillation in the device stopped. Accordingly, under the necessity of operating in a near part of the longest or the shortest wavelength in the variable range, there were a great obstacle in conducting an experiment, etc. by using such a laser light source.

On the other hand, there is requested to allow the resonator mirror to have a constant transmission over a broad wavelength band in order to obtain an optical output through the resonant mirror.

However, realization of such a special mirror is not so easy to make. FIGS. 3A and 3B show actual spectral output characteristics of laser in the case where mirrors A and B are used as the plane mirror 204 of the output port doubling as a resonator mirror (in this instance, the concave mirror 202 in FIG. 2 is assumed to be a broad band total reflection mirror). FIG. 3A shows the case where the mirror A is used, and FIG. 3B shows the case where the mirror B is used.

The mirror A is caused to have a flat spectral transmission characteristic. By the use of this mirror A, it is possible to continuously change the output wavelength, e.g., over the width of 65 nm ranging from 825 nm to 890 nm. However, with this mirror A, it is impossible to allow a laser output over a broad band. On the other hand, the mirror B is made to have a small transmission characteristic over a band as broad as possible. By the use of this mirror B, it is possible to obtain an output wavelength, e.g., over the width of 92 nm ranging from 820 nm to 912 nm. However, laser oscillation was occured only at the wavelengths indicated by the points on the graph. For this reason, it was difficult to continuously change the resonance wavelength. It is considered that the transmission characteristic of the mirror B is not so flat and the transmission factor of the mirror B is too large at the wavelength where no laser oscillation is occured.

As stated above, it is ordinarily difficult to make up a mirror having a constant transmission with keeping the transmission factor small over a broad band. If an attempt is made to allow the transmission to be a constant value, there results a narrow band. In contrast, if an attempt is made to realize a broad band, the transmission fails to be constant. As a result, with conventional laser, there was the problem that there cannot help being an output characteristic greatly dependent upon the characteristic of the resonator mirror. In addition, in the output characteristics shown in FIGS. 3A and 3B, the spectral width at the time of laser oscillation at respective wavelengths was a relatively broad of about 4 nm (FWHM: Full Width at Half Maximum).

SUMMARY OF THE INVENTION

With the above in view, an object of this invention is to provide a wavelength tunable laser device having a wavelength variable range of a broad band and capable of easily changing the output wavelength.

To solve the above-mentioned problems, a wavelength tunable laser device according to this invention comprises:

a main resonator including a laser medium and resonating a laser beam when the laser medium is excited;

a sub-resonator for selecting a desired wavelength of a laser beam outputted from the main resonator and returning the laser beam of the desired wavelength back to the laser medium; and excitation means for excitating the laser medium.

And this device further comprises an optical output port for taking out a laser beam to the outside of this device In a more practical sense, a wavelength tunable laser device according to this invention comprises:

a main resonator including at least two main resonator mirrors, a laser medium provided in a manner to be' put between the main resonator mirrors, and an optical input/output port for outputting a laser beam from the inside of the main resonator to the outside thereof, and inputting it from the outside of the main resonator to the inside thereof;

a sub-resonator including wavelength selection means for wavelength-selecting a laser beam outputted from the optical input/output port, optical feedback means for allowing the wavelength-selected laser beam to be fed back to the main resonator through the optical input/output port, and at least one sub-resonator mirror resonating with the optical feedback means;

excitation means for exciting the laser medium; and an optical output port provided at any one of the excitation means, the main resonator and the sub-resonator, and adapted to take out a laser beam to the outside of the wavelength tunable laser device.

In the above-mentioned wavelength tunable laser device, since there is no necessity of providing wavelength selection means within the main resonator, laser oscillation is easy. Accordingly, in the case where the gain of the laser medium is small, or the excitation energy is small, resonance can be made. In addition, since the main resonator can be placed in a resonating state at all times, the wavelength tunable laser device can be prevented from being stopped. Accordingly, employment of this wavelength tunable laser device does not constitute an obstacle in conducting an experiment using such device.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art detailed description.

BRIEF DESCRIPTION 02 DRAWINGS

FIG. 1 is a diagram showing the fundamental configuration the prior art.

FIG. 2 a view showing an example of an actual configuration of the prior art.

DESCRIPTION OF THE PREFERRED EMBODIMENTS

Figure 4:
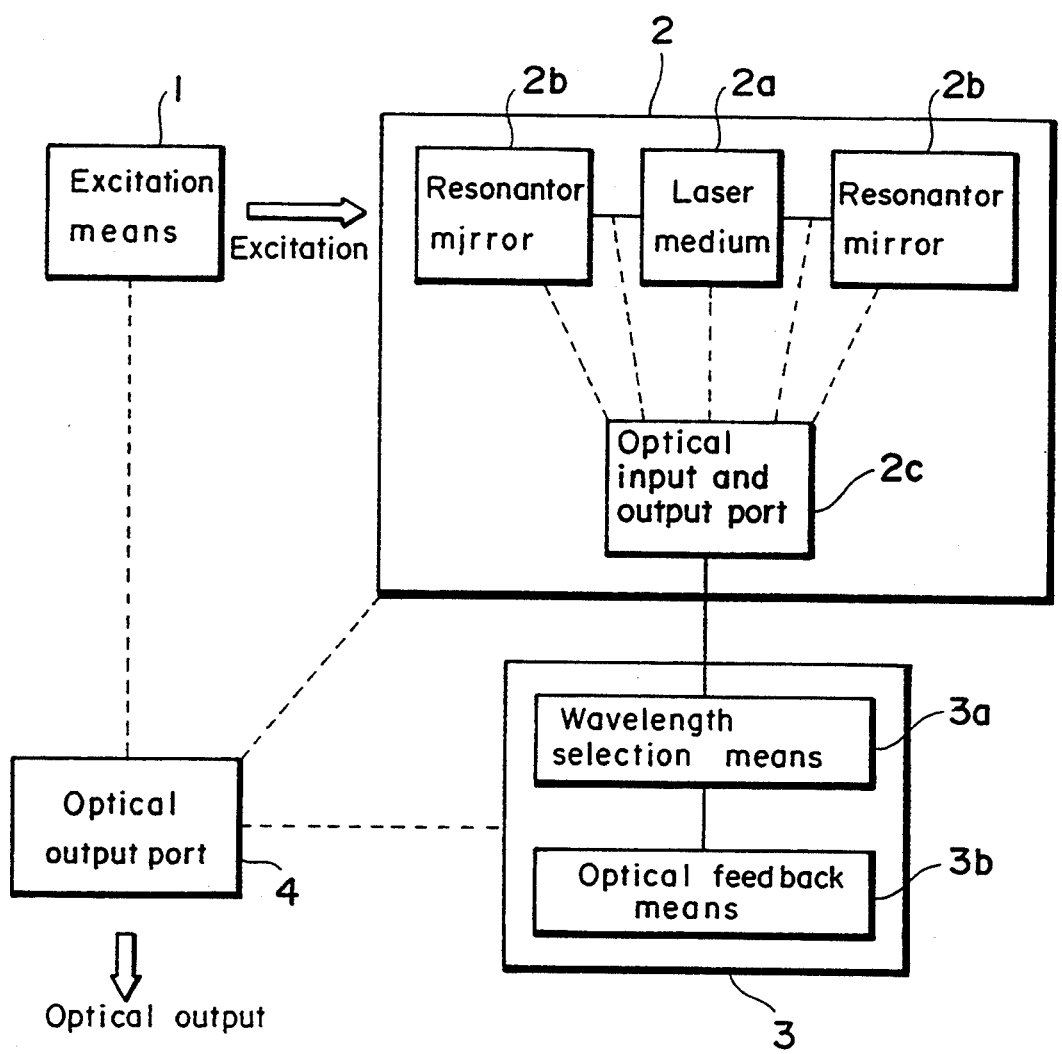
FIG. 4 is a block diagram showing the fundamental configuration of a wavelength variable laser device according to this invention.

FIG. 4 is a view showing the fundamental configuration of a wavelength tunable laser device of this invention. Excitation means 1 excites a laser medium 2a in a main resonator 2. The main resonator 2 includes two resonator mirrors 2b, the laser medium 2a put therebetween, and an optical input/output port 2c. Here, the main resonator 2 is defined as a resonator including a laser medium and capable of resonating and amplifying by itself, i.e., oscillating on getting an excitation light. By the excitation means 1 and the main resonator 2, a laser oscillation can be produced.

A sub-resonator 3 includes wavelength selection means 3a and optical feedback means 3b, and has a role of separating a laser output from the main resonator 2 into spectral components to feed them back to the main resonator. Here, the sub-resonator 3 is defined as a resonator which is operative followed by the operation of the main resonator 2, and therefore does not have a function of amplification by itself. At this time, the sub-resonator 3 is adapted so as to satisfy the condition of resonance only within the sub-resonator 3. In addition, it is desirable to employ a configuration such that the condition of resonance is satisfied even by combination of the sub-resonator 3 and the main resonator 2.

It is to be noted that resonance of the sub-resonator 3 takes place between optical components functioning as a pair of resonating mirrors which will be described later. The optical feedback means 3b functions as one resonating mirror. The other resonating mirror is determined in dependency upon what configuration is employed. In this embodiment, the input/output port 2c or the resonator mirror 2b of the main resonator 2 functions as the other resonating mirror. In addition, in dependency upon the configuration of the entirety of the device, for example, a resonator mirror (not shown) may be separately provided within the sub-resonator 3 to allow it to function as the other resonating mirror.

In the device composed of the excitation means 1, the main resonator 2 and the sub-resonator 3, an optical output port 4 for taking out a light output of a wavelength-selected laser beam to the external is provided. It is to be noted that this optical output port 4 may double as the above-described various means in function.

The laser medium 2a or either of two resonator mirrors 2b may double as the function of the optical input/output port 2c of the main resonator 2. On the other hand, a optical input/output port 2c may be separately provided therebetween. Further, any one of the excitation means 1, the main resonator 2 and the sub-resonator 3 may double as the function of the optical output port 4. On the other hand, an optical output port 4 may be separately disposed between respective components as mentioned above.

Various embodiments will now be described.

Figure 5:
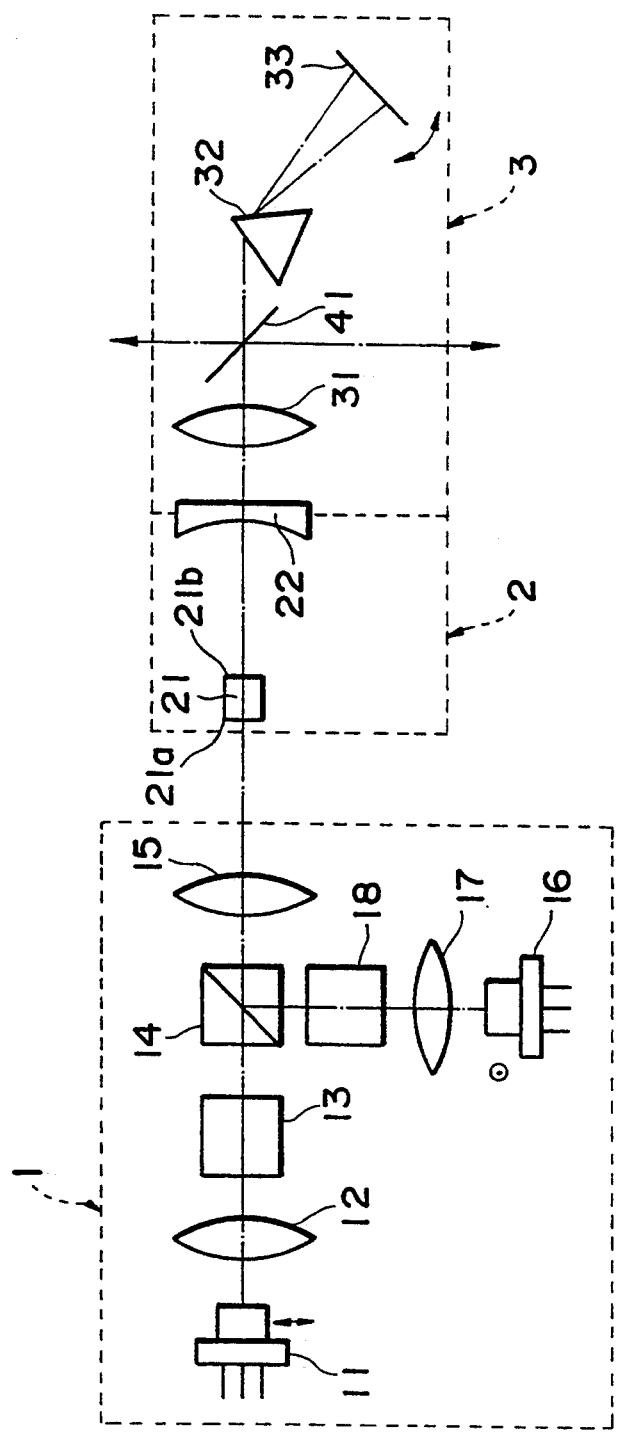
FIG. 5 is a view showing the configuration of a first embodiment.

FIG. 5 shows an actual configuration of a first embodiment. First, the configuration of the excitation means 1 will be briefly described. A laser diode 11, a collimating lens 12, an anamorphic prism pair 13, a polarization beam splitter 14, and a focusing lens 15 are provided in order on the optical axis of the laser diode 11. Further, a laser diode 16, a collimating lens 17 and an anamorphic prism pair 18 are provided on the optical axis of the above-described laser diode 11 by using the polarization beam spliter 14. The laser diode 11 and the laser diode 16 produces an output light having lineally polarized light perpendicular each other. Therefore, these output lights are coupled efficiently by the polarization beam spliter 14 and excite the laser medium 21.

In the first embodiment, there is disclosed the case where light excitation by a laser diode beam is used as the excitation means 1. For excitation, current, discharge, gas laser beam such as Ar laser, etc., a flash lamp light and a liquid laser beam such as dye laser, etc. may be used in stead of the above-mentioned laser diode beam.

The configuration of the main resonator 2 and the sub-resonator 3 will now be briefly described. An excitation light from the excitation means 1, i.e., an excitation light from the focusing lens 15 enters a laser medium 21 from the left end surface 21a and excites the laser medium 21. The left end surface 21a serves as a resonating mirror with respect to an resonance laser wavelength. An emitted light from the excited laser medium 21 resonates between the left end surface 21a and a concave reflection mirror 22, whereby a laser beam is produced. A collimating lens 31, a beam splitter 41, and a Brewster prism 32 are arranged in order on the optical axis of the laser beam passed through the concave reflection mirror 22. The laser beam is dispersed to have a spectral distribution by the Brewster prism 32. That is, the spectral distribution have refraction angles different every respective wavelengths. A total reflection mirror 33 is provided on an optical axis of a desired wavelength so as to be substantially perpendicular to the optical axis. In this embodiment, the reflection surface of the beam splitter 41 is provided with an angle of substantially 45° degrees relative to the optical axis of the laser beam.

As the laser medium in the main resonator 2, $Cr^{3+}$:LiSrAlF$_6$ medium as a solid-state laser medium was used. In addition, various media except for the above may be used. For example, coloring matter laser medium or gas laser medium, etc. may be used for this purpose.

As described above, one of two mirrors for resonating of the main resonator 2 is formed by coating onto the left end surface 21a of the laser medium 21. The other mirror is the concave reflection mirror 22, and this concave reflection mirror 22 is caused to have a characteristic permitting a part of light to be transmitted therethrough. So, concave reflection mirror 22 functions as the resonator mirror 2b, and also functions as the optical input/output port 2c, which were referred to in FIG. 4. The sub-resonator 3 is composed of a collimating lens 31, a Brewster prism 32 and a total reflection mirror 33. It is to be noted that laser resonance set by the sub-resonator 3 is produced by the total reflection mirror 33 and the concave surface of the concave reflection mirror 22. In addition, a beam splitter 41 is provided within the sub-resonator 3. This beam splitter 41 functions as the optical output port 4 which was referred to in FIG. 4.

An actual operation in the first embodiment of FIG. 5 will now be described. The laser diode 11 and 16 both produce an output light having a wavelength of about 670 nm for exitating a laser medium. The output light of the laser diode 11 has a polarization direction in parallel to the plane surface of paper and the output light of the laser diode 16 has a polarization direction vertical to the plane surface of paper. The collimating lenses 12 and 17 convert rays of output light from the respective laser diode 11 and 16 to rays of a parallel light, respectively. The anamorphic prism pairs 13 and 18 convert elliptical beams peculiar to the laser diode to circular beams, respectively. The polarization beam splitter 14 synthesizes rays of output light from the respective laser diode 11 and 16 to inject rays of light into the main resonator 2 in cooperation with the focusing lens 15. It is desirable that AR (anti reflection) coating is applied to the polarization beam splitter 14, and the focusing lenses 12, 17, etc.

The laser medium 21 ($Cr^{3+}$:LiSrAlF$_6$) is a wavelength variable solid-state laser medium. An excitation light from the excitation means I enters the laser medium 21 through the left end surface 21a. The left end surface 21a is adapted for allowing a light of 670 nm to be efficiently transmitted therethrough and for allowing a light of 865 nm to be reflected thereon. The left end surface 21a adapted for allowing an excitation light to be efficiently incident to the laser medium 21, and for confining an induced emission light. Further, the right end surface 21b of the laser medium 21 is AR-coated so that a light of 865 nm is not reflected thereon. Thus, loss of a laser resonance beam within the main resonator 2 can be reduced. The concave reflection mirror 22 is comprised of a concave surface and a flat surface. The concave surface is coated for 99% reflectivity and has a radius of curvature of 10 cm. The flat surface is AR-coated. In this laser device, the concave reflection mirror 22 serves as a mirror for resonator. Thus, this laser device is adapted to oscillate, i.e. is capable of resonating and amplifying the laser beam even if no sub-resonator 3 is provided. In addition, the concave reflection mirror 22 doubles as optical input/output port 2c.

The Brewster prism 32 serves to carry out selection of wavelength with low loss. The total reflection mirror 33 feeds a light back to the main resonator 2. It is desirable that the back of the total reflection mirror 33, and the collimating lens 31, etc. are coated for high transmission at the wavelength of the laser beam.

The beam splitter 41 takes out two rays of reflected light as an output beam. Namely, this beam splitter 41 functions as the optical output port 4. As the beam splitter 41, a glass plate may be used. At this time, it is desirable that the back of a glass plate in which coating is applied on its surface (i.e. the front of the glass plate) is AR-coated.

Further detailed explanation will be given with reference to FIG. 5. $Cr^{3+}$:LiSrAlF$_6$ as the laser medium 21 is a crystal of 5 mm cube into which $Cr^{3+}$ is doped by 3%. The resonator length of the main resonator 2 was set to about 10 cm. The resonator length is a distance between the left end surface 21a and a concave surface of the concave reflection mirror 22. When the intensity of an excitation light inputted to the main resonator 2 is 226 mW, an output beam in the case a laser of only the main resonator 2 had a maximum output of 52.6 mW, a center wavelength of 849.1 nm, and a spectral band width of 4.3 nm. The resonator length of the sub-resonator 3 was set to about 30 cm. The resonater length is a distance between the concave surface of the concave reflection mirror 22 and the total reflection mirror 33. A final output beam is taken out to the external by reflection of a beam on a glass plate used as the beam splitter 41 to be disposed within the sub-resonator 3. At this time, an angle was adjusted so that the reflectivity of the glass plate becomes equal to 7%. It is to be noted that this reflectivity includes reflectivites on the front surface and the back of the glass plate.

Figure 6:
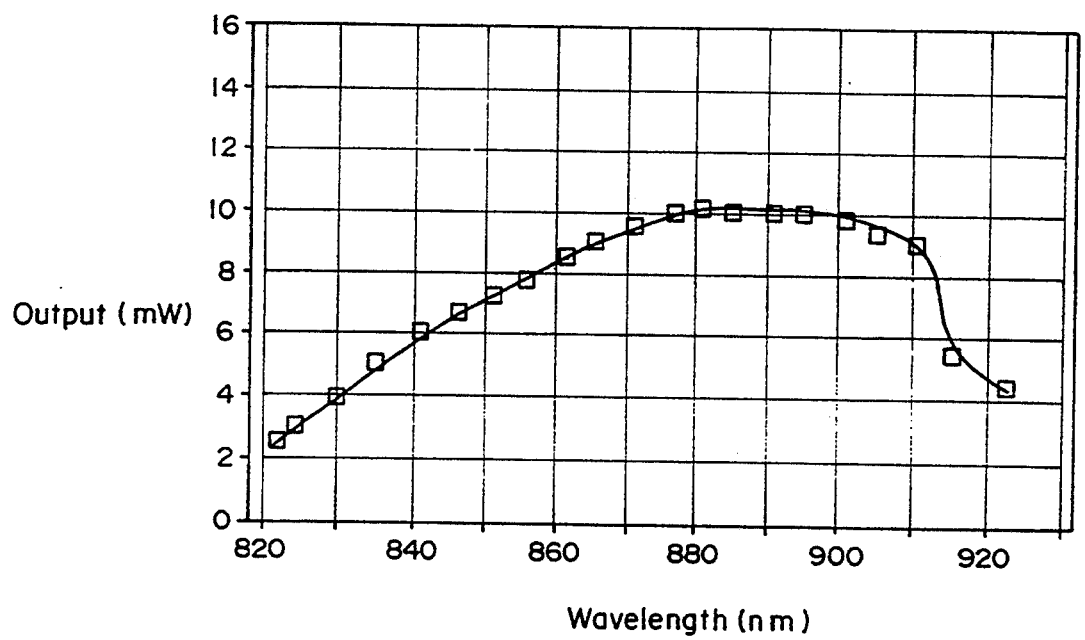
FIG. 6 is a view showing a spectral output characteristic 1 of laser.

FIG. 6 shows, as a graph, a spectral output characteristic obtained by the device of the above-described embodiment. The spectral band width of an output light became narrower to about 2 nm at respective wavelengths. Also as seen from FIG. 6, as an output of the entirety of this laser device, an output more than 2 mW is provided over a tunable range of 100 nm from 822 nm to 922 nm where a continuously wavelength tunable range is the broadest as all solid-state laser. In this case, an output of the laser device is obtained in two directions as already shown in FIG. 5. Changing of the wavelength of an output beam was carried out by rotating the total reflection mirror 33 serving as a resonating mirror for optical feedback in a direction as indicated by an arrow in the figure. Such a wavelength change may be performed by rotating the Brewster prism 32.

Figure 7:
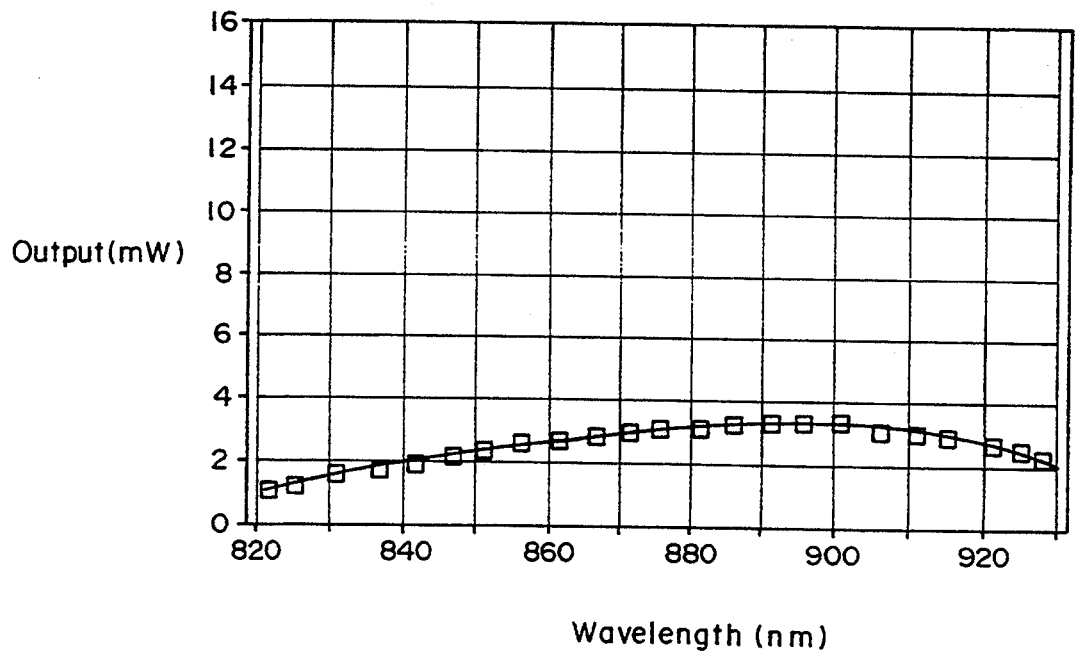
FIG. 7 is a view showing a spectral output characteristic 2 of laser.

FIG. 7 is a view showing a spectral output characteristic when an incident angle of light to the glass plate is changed so that the reflectivity is equal to 2.0%. In this case, an output was lowered, but an output of more than 1 mW was obtained over the tunable range of 110 nm from the wavelength of 820 nm to 930 nm.

Figure 8:
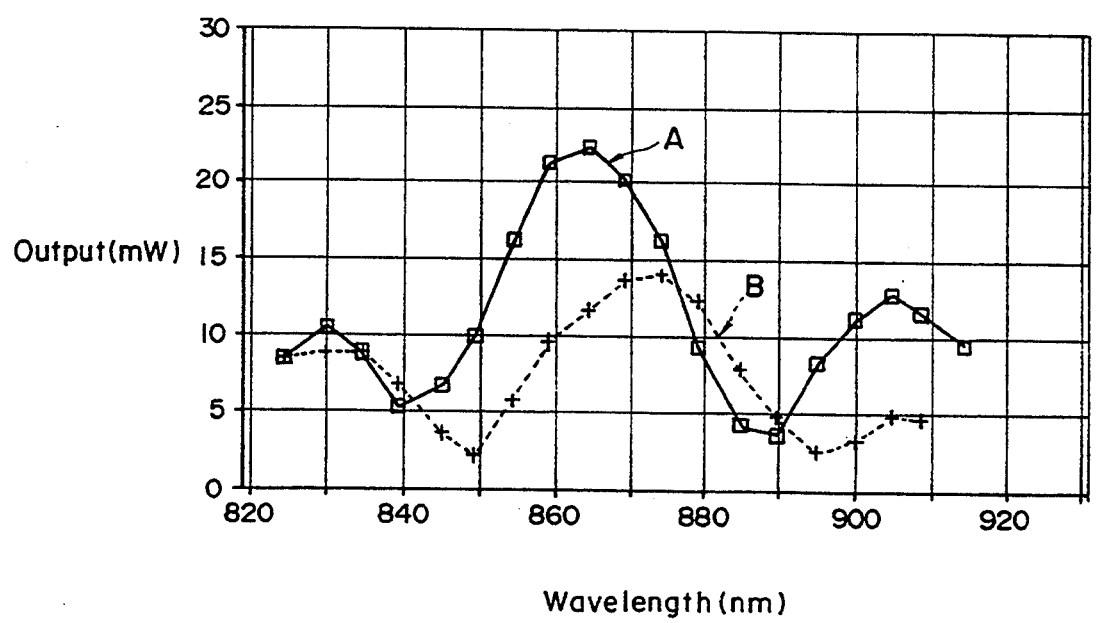
FIG. 8 is a view showing a spectral output characteristic 3 of laser.

FIG. 8 shows a spectral output characteristic of a laser device in the case where a dielectric multi-layer pellicle of a thin film of 8 $\mu$is used as the beam splitter 41. Curves A and B both show curves slightly dependent upon the spectral reflection characteristic of the pellicle. The wavelength tunable range was 90 nm in the case of the curve A, and was 86 nm in the case of the curve B. If the wavelength variable range is limited to a specific wavelength range, a higher output is obtained. In addition, beam splitter 41 utilized as the optical output port 4 may be a cube beam splitter.

Modified embodiments of the main parts based on the first embodiment will be disclosed below.

First, other embodiments in the excitation means 1 will be first referred to.

Figure 9:
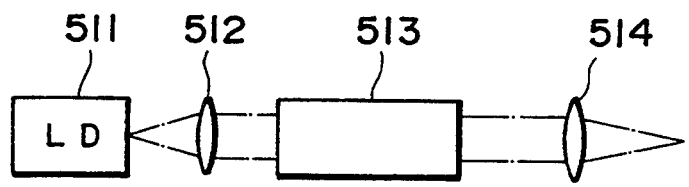
FIGS. 9 to 12 are views showing various other embodiments of excitation means, respectively.

FIG. 9 shows only the configuration of the excitation means. This configuration will be briefly described. A laser diode 511, a collimating lens 512, an anamorphic prism pair 513, and a focusing lens 514 are arranged in order on the optical axis of the laser diode 511. An excitation light focused by the focusing lens 514 enters a laser medium (not shown) of the main resonator, While excitation is carried out by two laser diodes in the first embodiment, excitation may be carried out by a single laser diode 511 as shown in FIG. 9. In the case where excitation is carried out by Ar laser, etc. in place of laser diode 511, collimating lens 512, anamorphic prism pair 513 and focusing lens 514, etc. may be omitted. This applies to other excitation means which will be described later.

Figure 10:
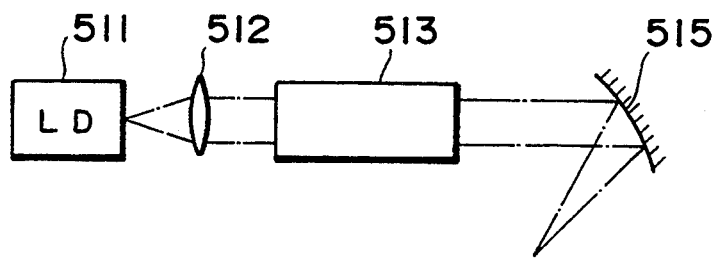

A further embodiment is shown in FIG. 10. A concave mirror 515 may be used in place of the focusing lens 514 of FIG. 9 to focus an excitation light to thereby excite a laser medium (not shown). It is a matter of course that a method of transversely exciting a laser crystal may be employed.

Figure 11:
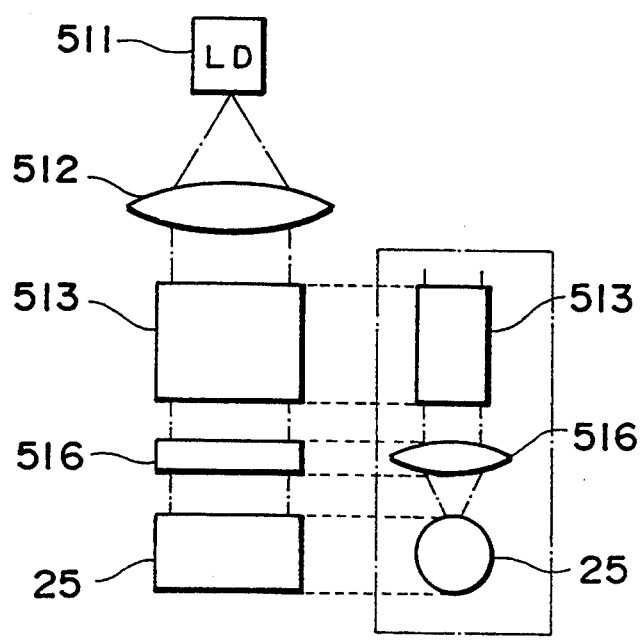
Figure 12:
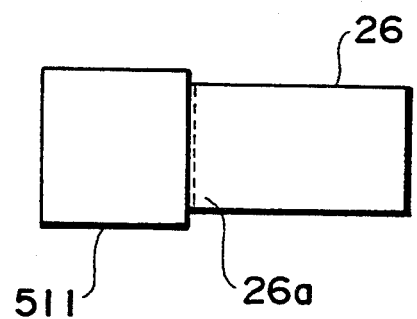

A still further embodiment is shown in FIG. 11. In this embodiment, a cylindrical lens 516 may be used in place of focusing lens 514 shown in FIG. 9 to focus an excitation light to irradiate it onto a laser medium 25. Moreover, if an excitation light is a strong light, it is unnecessary to focus the light. In this case, it is necessary to allow the laser diode 511 to be as close as possible relative to the laser medium 25. FIG. 12 shows excitation means 1 in which the laser diode 511 is in contact with a laser medium 26 at the portion serving as a resonating mirror 26a to which high reflectivity coating is applied.

Other embodiments relating to the main resonator will now be disclosed in FIGS. 13 to 16.

Figure 13:
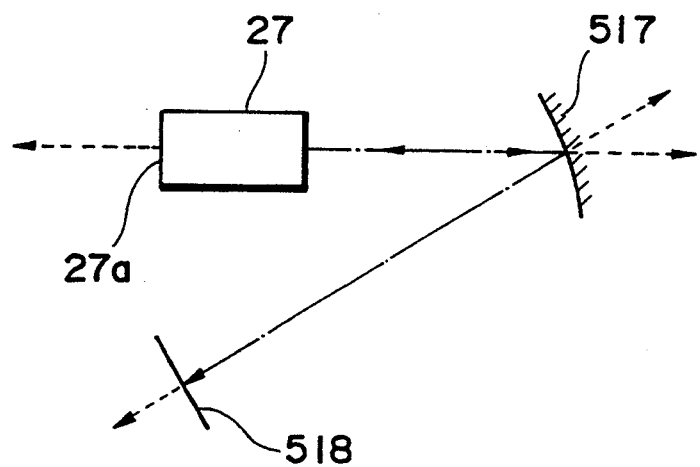
FIGS. 13 to 16 are views showing various other embodiments of the main resonator, respectively.

As shown in FIG. 13, a resonating mirror 27a is formed by applying coating onto one end surface of a laser medium 27, and a concave mirror 517 is disposed on the optical axis of a laser beam from the other end surface of the laser medium 27. Further, a plane mirror 518 is disposed on the optical axis of a laser beam reflected by the concave mirror 517. At this time, the optical input/output port 2c (which was referred to in FIG. 4) for carrying out input/output of a laser beam to and from a main resonator and a sub-resonator (both of which are not shown) may be used so as to double as any one of the resonating mirror 27a, the concave mirror 517, and the plane mirror 518 shown in FIG. 13.

In addition, when the concave mirror is used as the optical input/output port, at least one of two laser beams is used.

Figure 14:
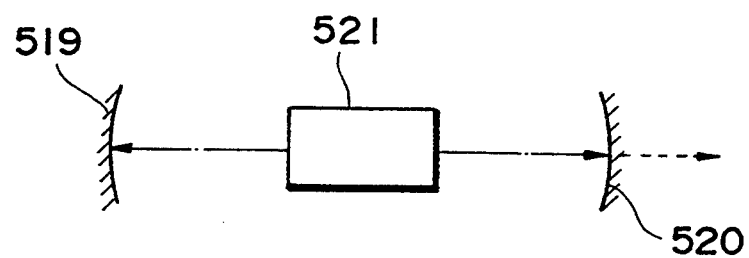
Figure 15:
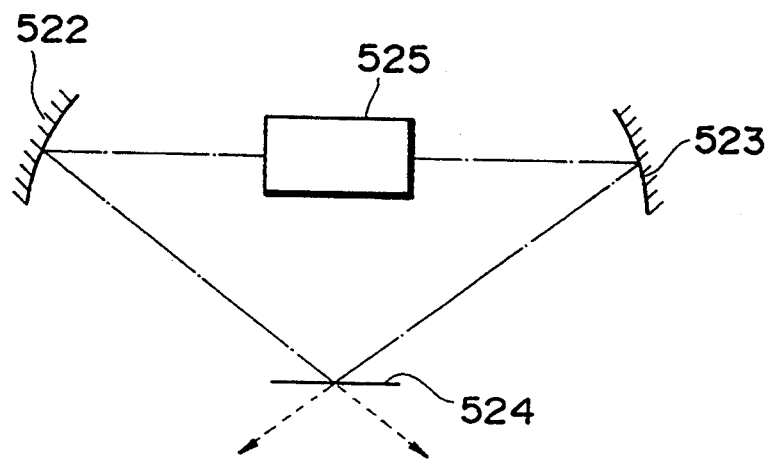

Similarly, as shown in FIG. 14, when a laser medium 521 is provided so as to be put between two concave mirrors 519 and 520 constituting a main resonator, any one of the concave mirrors 519 and 520 may be used as optical input/output port 2c (which was referred to in FIG. 4). In FIG. 15, two concave mirrors 522 and 523 and a plane mirror 524 are arranged at the positions of respective vertices of a triangle, and a laser medium 525 is provided between two concave mirrors 522 and 523. Moreover, the plane mirror 524 may be used as optical input/output port 2c (in FIG. 4) to constitute main resonator 2 (in FIG. 4). In this case, at least one of two beams is used as an output beam. In addition, the concave mirrors 522 and 523 may be a parabolic type reflection mirror.

Figure 16:
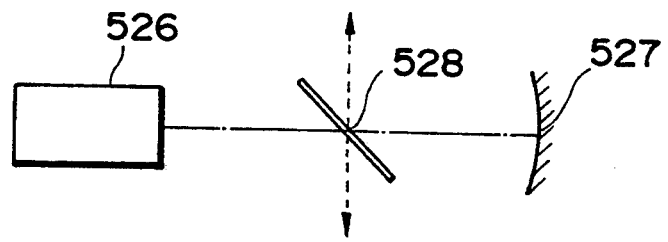

As shown in FIG. 16, a beam splitter 528 may be disposed substantially at a Brewster angle between a laser medium 526 and a concave mirror 527 to use this beam splitter 528 as optical input/output port 2c (which was referred to in FIG. 4). At this time, at least one of two beams is used as an output beam. In this case, it is desirable that AR coating is implemented to the other surface of the beam splitter 528. In addition, the beam splitter 528 may be a glass plate.

A beam splitter may be disposed within any one of resonators of the embodiments shown in FIGS. 13 to 15 to utilize this as an input/output port. In this case, it is unnecessary to allow the resonating mirror to have any transmittivities, and it is sufficient to apply only high reflectivity coating thereto. For this reason, it becomes easy to coating.

Other embodiments relating to the wavelength selection means and the optical feedback means in the sub-resonator are shown in FIGS. 17 to 23. It should be noted that description of the collimating lens 31 and the beam splitter 41 provided in the sub-resonator in FIG. 5 will be omitted as long as there is no necessity of specifically referring to those components.

Figure 17:
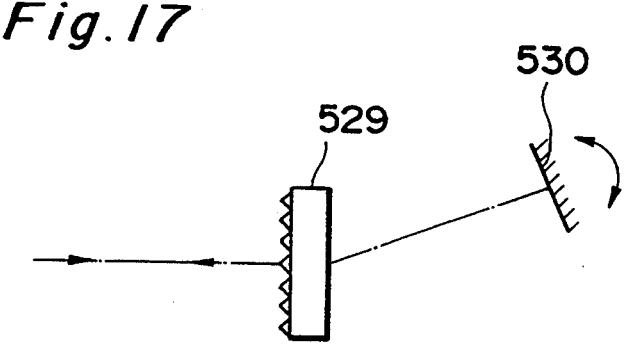
FIGS. 17 to 23 are views showing various other embodiments of the sub-resonator, respectively.

There may be employed a configuration as shown in FIG. 17 in which a laser beam from the main resonator is caused to enter a transmission grating 529 to allow a refracted laser beam to be reflected by a total reflection mirror 530. In accordance with this configuration, an angle of refraction varies depending upon the wavelength of a laser beam incident to the transmission grating 529. Accordingly, a light is subjected to total reflection at specific position/angle, thereby making it possible to carry out selection of wavelength. In this configuration, the transmission grating 529 is used as the wavelength selection means, and the total reflection mirror 530 is used as the optical feedback means.

Figure 18:
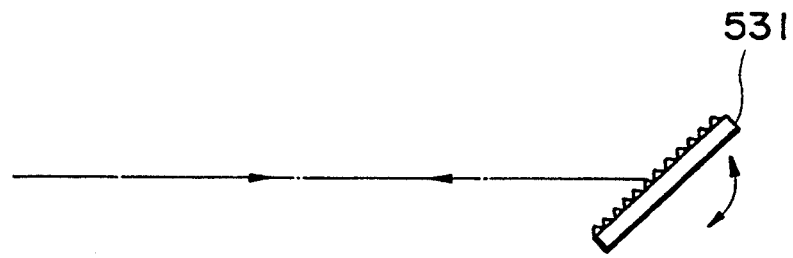
Figure 19:
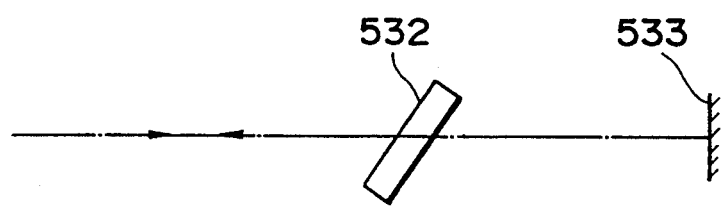

Further, there may be employed a configuration as shown in FIG. 18 such that a laser beam from the main resonator is caused to enter directly a reflection grating 531 at a suitable angle and to be reflected thereon. In accordance with this configuration, an angle of reflection varies depending upon the wavelength of a laser beam incident to the reflection grating 531. Accordingly, a laser beam is caused to be reflected at a specific angle, thereby making it possible to carry out selection of wavelength. In this configuration, the reflection grating 531 is used so as to serve as both the wavelength selection means and the optical feedback means.

Further, a double refraction filter 532 and a total reflection mirror 533 may be arranged in order on the optical axis of a laser beam from the main resonator. The double refraction filter 532 adapted to vary the wavelength depending upon an angle of rotation is used, thereby making it possible to carry out selection of wavelength. At this time, it is desirable that the double refraction filter 532 is disposed at a Brewster angle.

In addition, an etalon or an interference filter, etc. may be used as the wavelength selection means, or a structure in which they are combined or a structure in which they are subjected to a multi-stage connection may be used. Further, there may be employed a configuration such that when two beams are obtained from the optical input/output port as shown in FIGS. 15 and 16, one beam is caused to be ordinarily outputted, and the other beam is synthesized with one beam to output a synthesized beam. In addition, there may be employed a configuration such that one beam is ordinarily taken out, and the other beam is reflected by using a total reflection mirror to carry out feedback of an output as a reflected beam.

Figure 20:
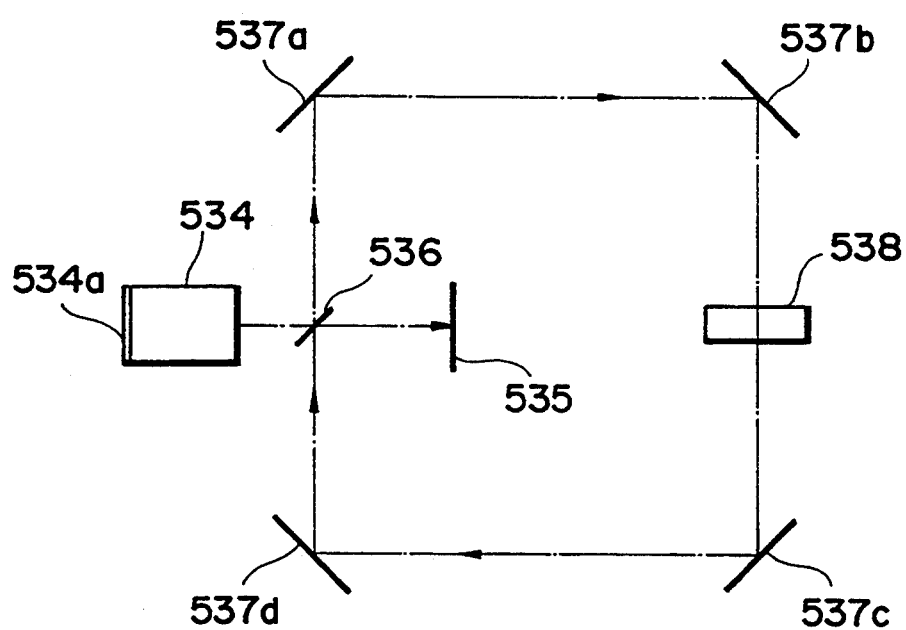

The example where a resonating mirror of the main resonator is not used as one of resonating mirrors of the sub-resonator. In FIG. 20, a main resonator is constituted by a laser medium 534 excited by excitation means (not shown), one end surface 534a of the laser medium 534 to which reflection coating is implemented, a total reflection mirror 535, and a beam splitter 536. Moreover, total reflection mirrors 537a–d are arranged at respective vertices of a square, and a double refraction filter 538 is provided between total reflection mirrors 537b and 537c, thereby to carry out selection of wavelength. A laser beam from the laser medium 534 is introduced through the beam splitter 536 disposed between the total reflection mirrors 537a and 537d.

There exist rays of light in a traveling direction opposite to a traveling direction of light indicated by an arrow. With respect to both rays of light, wavelengths to be selected may be equal to each other. In addition, an optical isolator may be inserted in the middle of an optical path so as to use only the light in one traveling direction. In the case of the configuration shown in FIG. 20, feedback means of the sub-resonator is constituted by all the total reflection mirrors 537a–d.

Figure 21:
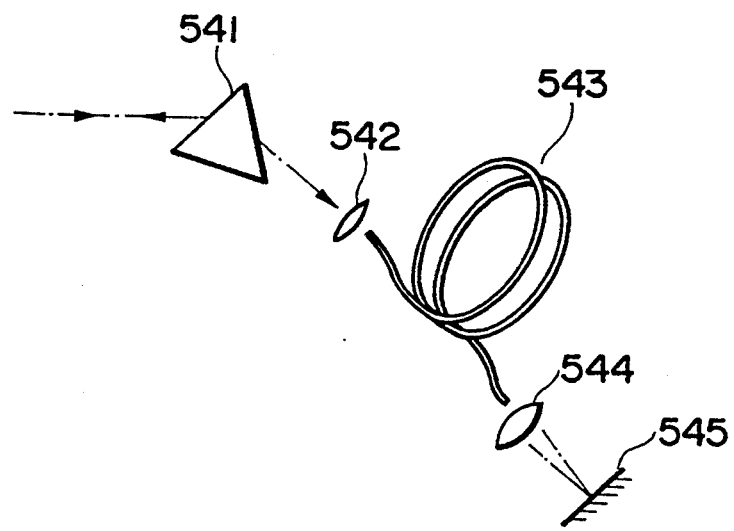

A modified example of the configuration between the Brewster prism 32 and the total reflection mirror 33 in FIG. 5 is shown in FIG. 21. In this figure, a laser beam from the main resonator 2 is dispersed to have a spectral distribution by a Brewster prism 541. Thus, the spectral distribution have refraction angles different every wavelength. A focusing lens 542, an optical fiber 543, a lens 544, and a total reflection mirror 545 are arranged in order on the optical axis of a desired wavelength, While the optical feedback means is comprised of the total reflection mirror 33 in FIG. 5, the optical feedback means is comprised of combination of the focusing lens 542, the optical fiber 543, the lens 544, and the total reflection mirror 545 in FIG. 21. For the purpose of changing wavelength, there may be employed a method of rotating a structure in which combined light feedback means is integrally formed, or a method of rotating the prism 541 may be employed.

Figure 22:
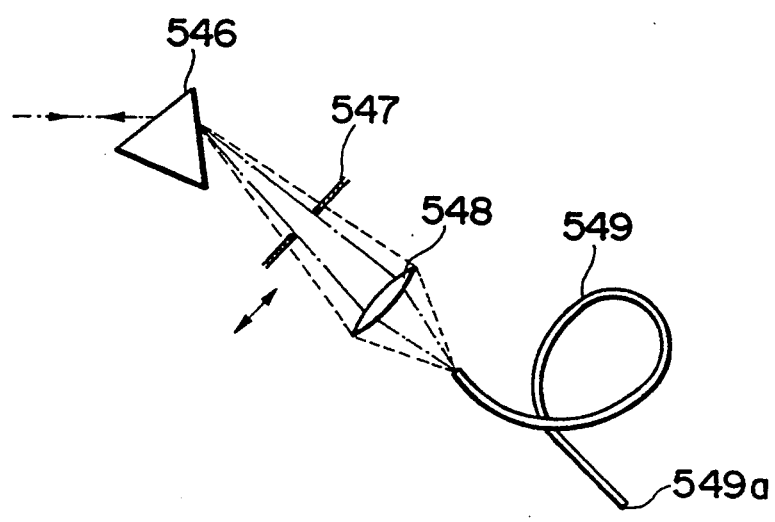

Another example of the configuration is shown in FIG. 22. A laser beam from the main resonator 2 is dispersed rays of light spreading every wavelength by a Brewster prism 546. A slit 547, a focusing lens 548, and an optical fiber 549 are arranged in order on the above-mentioned spectrum- In this embodiment, coating is applied to the end surface 549a opposite to the incident side of the optical fiber 549 so that a light is subjected to total reflection. At this time, the focusing lens 548 is adjusted so as to allow rays of light dispersed by the prism 546 to enter the optical fiber 549. In accordance with this configuration, selection of wavelength can be carried out by moving the slit 547 disposed between the prism 546 and the focusing lens 548. Such a wavelength change may be performed by rotating the Brewster prism 546.

Figure 23:
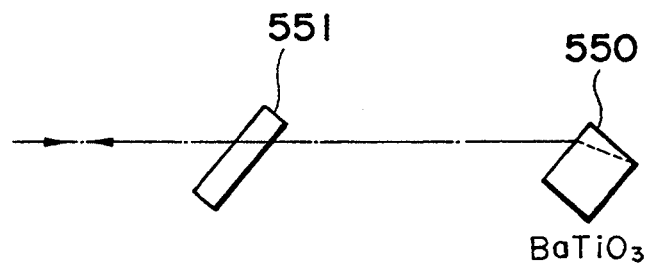

In addition, as shown in FIG. 23, crystal for producing phase conjugate rays, e.g., $BaTiO_3$ crystal 550 may be used as the optical feedback means in place of the total reflection mirror to carry out optical feedback of those phase conjugate rays. In FIG. 23, a double birefringence filter 551 is disposed as the wavelength selection means on that optical axis.

Embodiments except for the above-mentioned first embodiment in the optical output port will be now disclosed.

There may be employed a configuration such that in the case where an optical output port is provided in the sub-resonator, the total reflection mirrors in FIGS. 17, 19, 20, 21 and 22 are caused to be a reflection mirror permitting a light to be partially transmitted therethrough to obtain an output therefrom. In the case where there is an optical material having a plane which is not vertical to the optical axis (e.g., transmission grating 529 in FIG. 17) between the main resonator and the total reflection surface as in the cases shown in FIGS. 17, 19, 20, 21, 22 and 23, rays of a reflected light which are not basically utilized are subsidiarily produced- By utilizing such subsidiary rays of reflected light, that optical material may be used as the optical output port. Further, subsidiary rays of reflected light, etc. on the lens surface of FIG. 5 may be utilized. In this case, there may be employed a scheme such that a convex lens is constituted as a plane-convex lens in which the convex side is AR-coated to use a reflected light on the plane end surface. In addition, it is preferable that reflection coating is applied to the plane end surface.

There may be also employed a configuration such that in the case where optical output port 4 is configured in the main resonator 2, when two beams in FIG. 15 or 16, etc. can be utilized as those for the optical input/output 2c of the main resonator 2, one beam is utilized as that for the optical input/output port 2c, and the other beam is utilized as the optical output port 4.

(In this paragraph, the above-described reference signs were referred to in FIG. 4.)

There may be also employed a configuration such that when the concave mirrors 517, 519 and 520 and the plane mirror 518 as shown in FIGS. 13 and 14, etc. are caused to be a reflection mirror permitting a light to be partially transmitted therethrough to use each reflection mirror as the optical input/output port of the main resonator, the other mirror which is not used as the optical input/output port is caused to be a reflection mirror permitting a light to be partially transmitted therethrough to use it as the optical output port.

Figure 24:
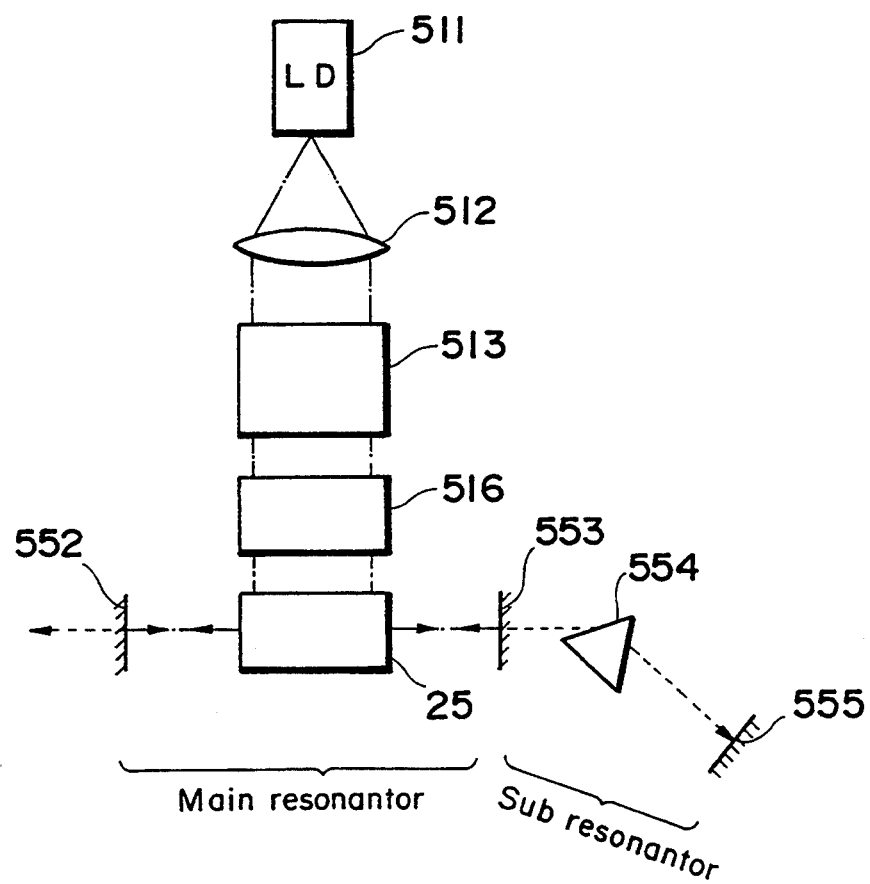
FIG. 24 is a view showing another embodiment relating to the optical output port in the embodiment of FIG. 11.

A modified example of the optical output port of the wavelength tunable laser device using excitation means shown in FIG. 11 is shown in FIG. 24. A laser medium 25 excited by the excitation means 1 (shown in FIG. 11) is put between plane mirrors 552 and 553. A Brewster prism 554 is provided on the extension of the optical axis of the plane mirror 553, and a total reflection mirror 555 is provided on the optical axis having a refraction angle of a desired wavelength. The plane mirror 552 serves as both the resonator mirror and the optical input/output port and the plane mirror 553 serves as both the resonator mirror and the optical input/output port. It is to be noted that description of lens in the main resonator and the sub-resonator is omitted.

Figure 25:
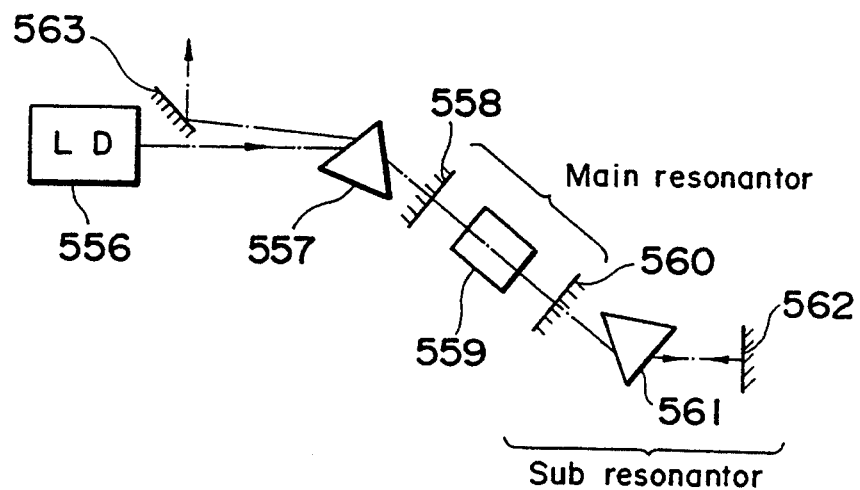
FIG. 25 is a view showing a further embodiment of the optical output port.

The case where optical output port is provided within the excitation means is shown in FIG. 25. It is to be noted that description of a focusing lens and a lens for changing a light to a parallel light is omitted. An excitation light from a laser diode 556 is refracted by a prism 557, and then enters plane mirror 558, a laser medium 559 and a plane mirror 560 in order. Main resonator is constituted by the plane mirrors 558 and 560 and the laser medium put therebetween. A laser beam transmitted through the plane mirror 560 is refracted by a Brewster prism 561, and is then reflected by a total reflection mirror 562 on the optical axis having a refraction angle of a desired wavelength. The reflected light thus obtained returns on that optical axis for a second time. A laser be partially transmitted through the plane mirror 558 from the interior of the main resonator is refracted by the prism 557, and is then Outputted to the external by the total reflection mirror 562 provided on that optical axis. It should be noted that since a wavelength of an excitation light from the laser diode 556 and a wavelength of a wavelength-selected laser beam are different from each other, those wavelengths are discriminated by the prism 557, thus making it possible to output them without being passed through the same optical path.

Figure 26:
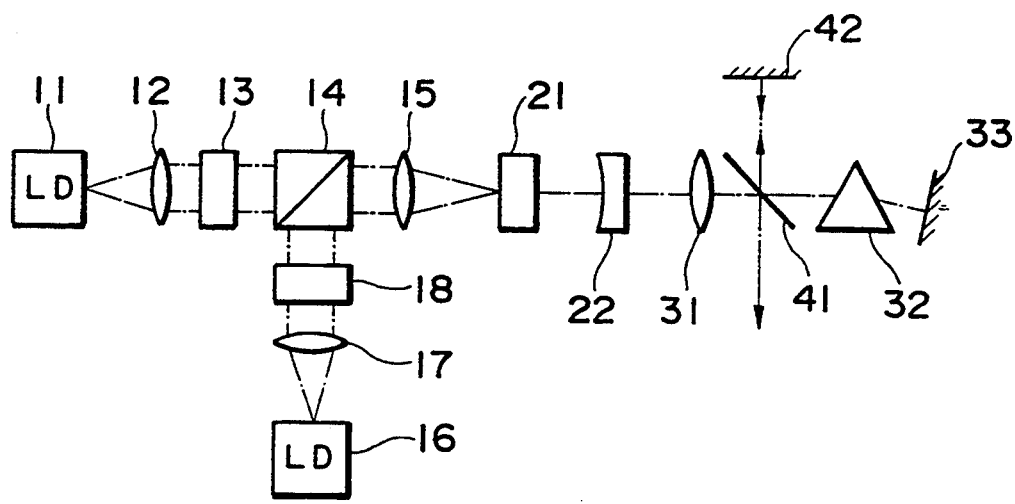
FIGS. 26 and 27 are views showing other embodiments of a wavelength tunable laser, respectively.

There may be employed a configuration such that when two beams are obtained from the optical output port, a total reflection mirror is provided to output them from only one side. A modified example of FIG. 5 when two beams are outputted only from one side is shown in FIG. 26. The configuration of FIG. 26 is the same as the configuration of FIG. 5 except that a total reflection mirror 42 for reflecting one of two beams outputted from the beam splitter 41 is further provided.

In accordance with this device, one beam is reflected by the total reflection mirror 42, and a reflected light enters the beam splitter 41 for a second time. A portion of the incident beam is synthesized with the other beam, and is outputted to the external as an optical output. On the other hand, the remainder is returned to the sub-resonator.

Figure 27:
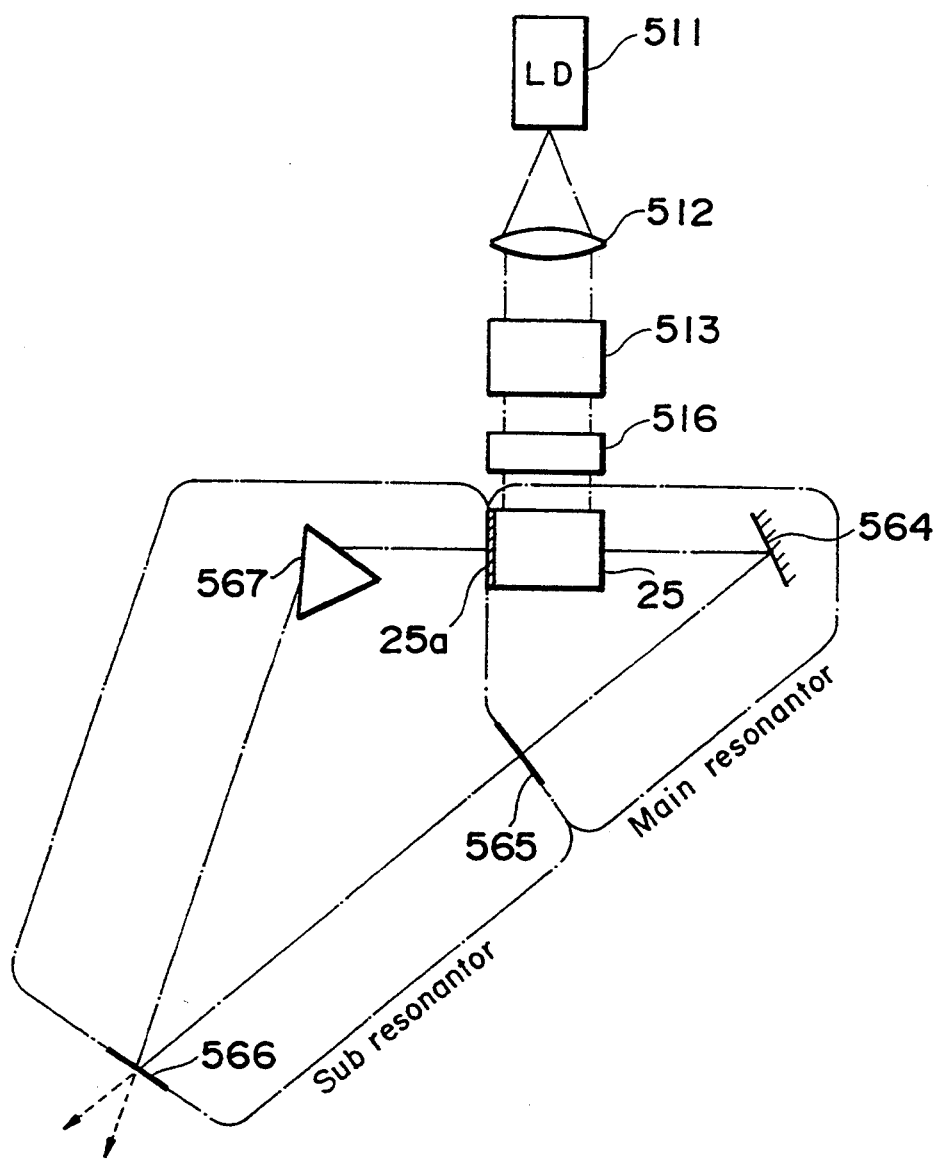

Further, as shown in FIG. 27, the laser may be of a structure in a ring form such that the main resonator and the sub-resonator are combined. The laser medium 25 is excited by excitation means of the configuration shown in FIG. 11. A reflection coating permitting a laser beam to be partially transmitted therethrough is applied to one end surface 25a of the laser medium 25. The end surface 25a thus coating-processed functions as one resonator mirror of the main resonator, and also functions as an optical input/output port for inputting/outputting a laser beam to and from the sub-resonator.

A laser beam outputted from the other end surface of the laser medium 25 is reflected by a total reflection mirror 564, and then enters a plane mirror 565. The plane mirror 565 function as the other resonator mirror of the main resonator, and also functions as an optical input/output port for inputting/outputting a laser beam to and from the sub-resonator.

A laser beam transmitted through the plane mirror 565 enters a plane mirror 566 of a partial transmission type. A laser beam reflected by the plane mirror 566 enters a Brewster prism 567, at which it is refracted. The laser beam thus refracted enters the end surface 25a of the laser medium 25. The plane mirror 566 functions as optical feedback means, and also functions as an optical output port for outputting a laser beam to the external. In addition, the Brewster prism 567 functions as the wavelength selection means. Thus, the sub-resonator is constituted with the plane mirror 566 and the Brewster prism 567.

It is to be noted that while only the path of a laser beam outputted from the other end surface of the laser medium 25 has been described with respect to a clockwise direction, it is needless to say that there is a path of a counter clockwise direction laser beam transmitted from one end surface 25a, and paths where a light is reflected by respective mirrors.

The above-described embodiments are combined in various manners in respective components, thereby making it possible to constitute a wavelength tunable laser.

When it is assumed that the resonator length ($L_{sub}$) of the sub-resonator is a multiple of integer or one divided by integer of the resonator length ($L_{main}$) of the main resonator, amplitude can be applied at a multiple of integer of a frequency interval between longitudinal modes, i.e., a frequency of a multiple of integer (1, 2, 3, . . . ) of f determined by $f=C/2L_{main}$ (when the main resonator is in a ring form, f is expressed as $f=C/L_{main}$). In case of the resonater is a Fabry-Perot type resonator, the resonator length is a distance substantially between two resonator mirrors. A laser device capable of performing an amplitude according to a second invention will now be described.

Figure 28:
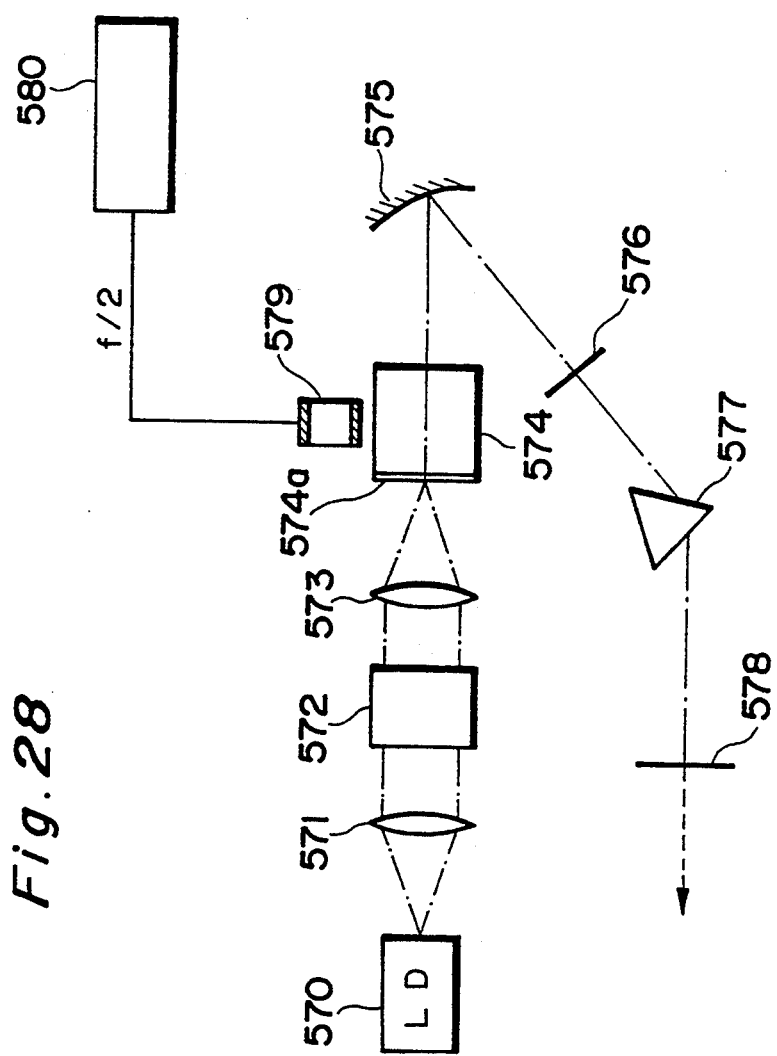
FIG. 28 is a view showing an embodiment according to a second invention.

A modulation unit using an E-O element (Electro-Optic Modulator), or an A-O element (Acousto-Optic Modulator) is provided, thereby making it possible to obtain a laser device which can perform amplitude modulation. The example where a solid-state laser medium itself is used as the A-O element or modulator is shown in FIG. 28.

A collimating lens 571, an anamorphic prism pair 572, and a focusing lens 573 are provided in order on the optical axis of a laser diode 570. An excitation light from the focusing lens 573 is incident from a left end surface 574a to a laser medium 574. Such a coating to reflect a light with respect to the wavelength of an resonance laser beam of the main resonator and to allow a light to be transmitted therethrough with respect to the wavelength of an excitation light is applied to the left end surface 574a. A laser beam emitted from the right end surface of the laser medium 574 enters a plane mirror 576 through a concave mirror 575. Here, the left end surface 574a and the plane mirror 576 function as a resonating mirror of the main resonator, and the plane mirror 576 also functions as the optical input/output port and one resonating mirror of the sub-resonator.

On the optical axis of a laser beam passed through the plane mirror 576, a Brewster prism 577 is disposed. By this Brewster prism 577, laser beams having refraction angles different every wavelength are provided. A plane mirror 578 is provided on the optical axis of a desired wavelength substantially perpendicular to that optical axis. In this embodiment, the plane mirror 578 doubles as the function of an optical output port for outputting a laser beam of a desired wavelength to the external.

The above-mentioned configuration and function are similar to those of the previously described first invention. The configuration shown in FIG. 28 as the second invention is characterized in that a piezo element 579 is further connected to the laser medium 574. A signal of the frequency of f/2 mentioned above is applied to the piezo element 579 by a controller 580 in order to allow the laser device to perform amplitude modulation of f.

In addition, Kerr lens mode lock utilizing optical non-linearlity of the laser medium itself can be utilized. In this case, the laser device carries out self mode lock, so that a pulse laser is provided.

Figure 29:
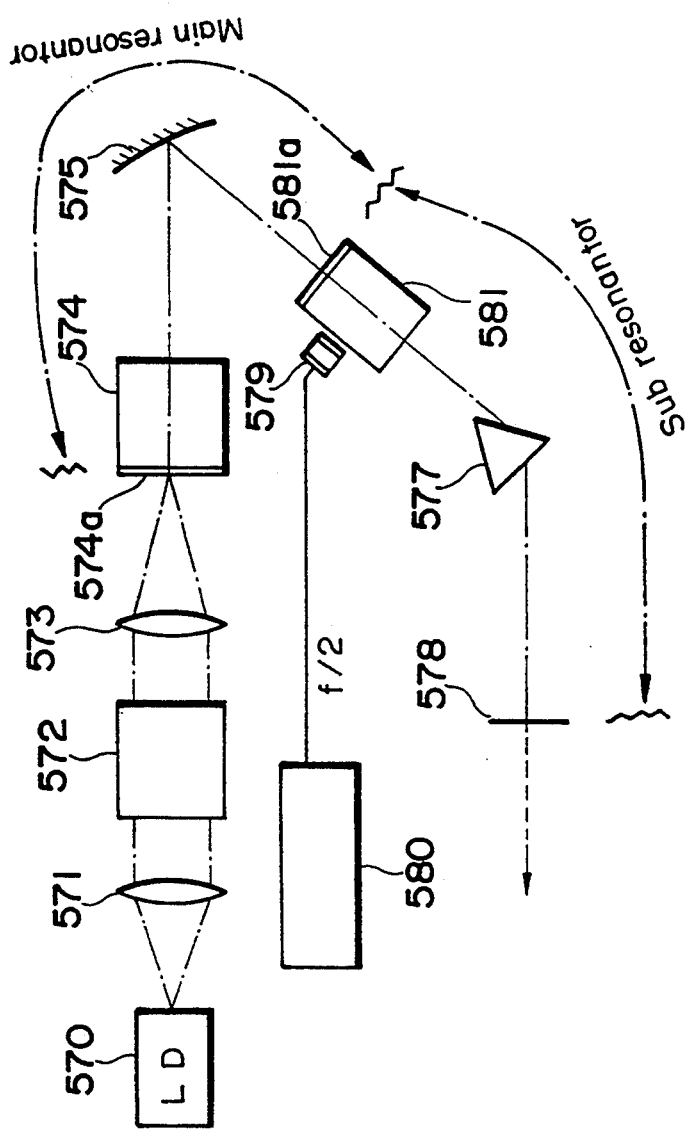
FIG. 29 is a view showing another embodiment relating to the second invention.

The example where piezo element 579 is connected to an output mirror 581 in place of connecting the piezo element 579 to the laser medium 574 is shown in FIG. 29 as a modified example of FIG. 28. In this example, output mirror 581 doubling as an optical input/output port of the main resonator is caused to be thick to use it as an A-O element, and a modulation unit is provided in the sub-resonator. In this figure, other components are similar to those of FIG. 28. In addition, as in the examples of FIGS. 21 and 22, an additive mode lock utilizing interference effect of light can be utilized, In this case, the laser device carries out self mode lock, so that a pulse laser is provided.

Figure 30:
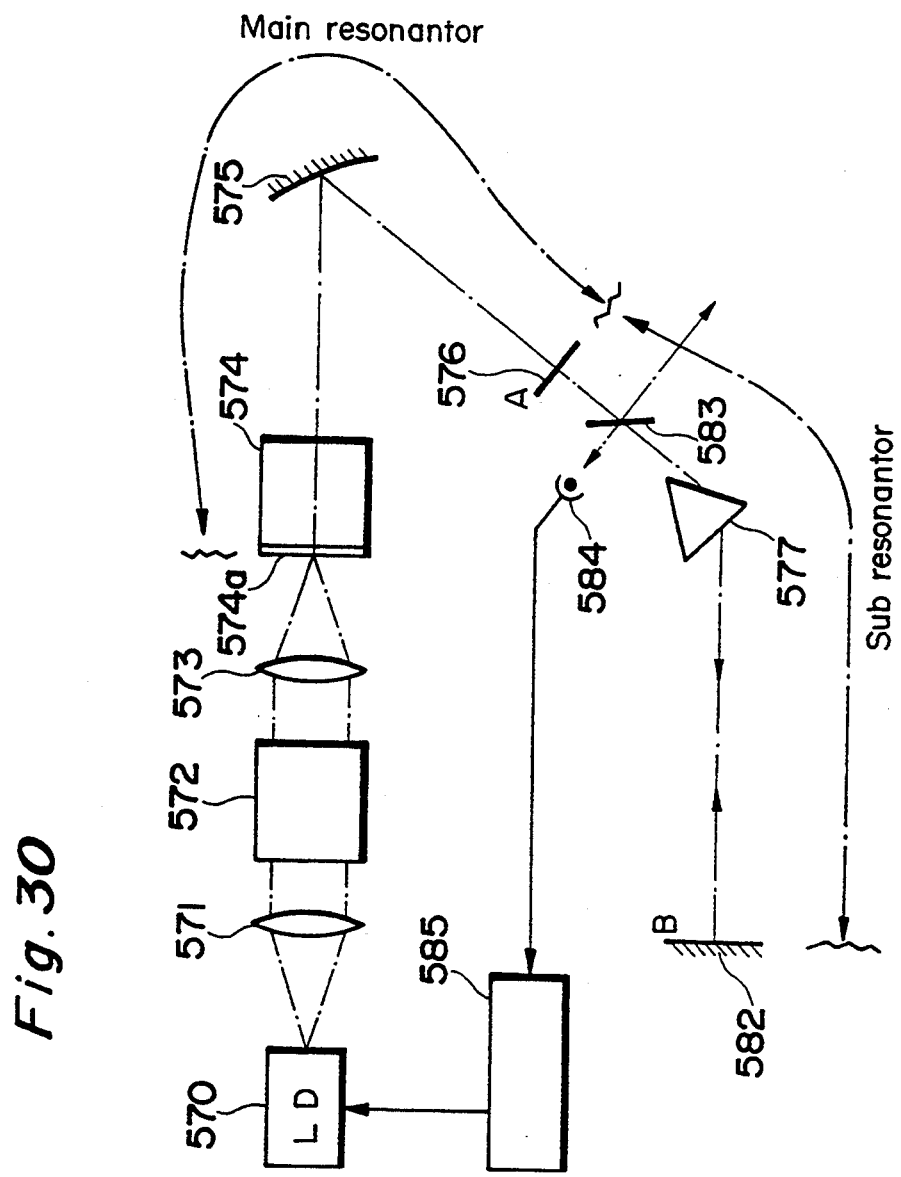
FIG. 30 is a view showing an embodiment according to a third invention.

As a third invention, there is presented a configuration in which when two beams are obtained from the optical output port, light intensity of one beam is converted to a current or voltage signal by a photoelectric converter to stabilize a laser beam on the basis of this signal. The configuration of the third invention is shown in FIG. 30. This configuration differs from the configuration of FIG. 28 in that the modulation unit (piezo element 579, controller 580) is excluded from the configuration of FIG. 28, that the plane mirror 578 is replaced by a total reflection mirror 582, and that a beam splitter 583 is provided as an optical output port between the plane mirror 576 and the Brewster prism 577. Further, light intensity of one of two beams of an output light from the beam splitter 583 is converted to a current or voltage signal by a photoelectric converter 584 to control the laser diode 570 by a control circuit 585 on the basis of this signal.

An output signal from the photoelectric converter 584 is fed back to the laser diode 570 serving as a light source for excitation via the control circuit 585 to change an output of the laser diode 570, thus to stabilize an optical output. In addition, there may be employed a configuration adapted to input an output signal to a piezo element (not shown) to change, in a direction of the optical axis, the plane mirror 576 as an optical resonator mirror doubling as the optical input/output port of the main resonator, or the total reflection mirror 582 as optical feedback means of the sub-resonator to change at least one of the resonator lengths $L_{main}$ and $L_{sub}$, thus to stabilize an optical output.

Moreover, the above-described second and third inventions may be combined to apply the technical content thus obtained to the first invention. For example, there may be employed a configuration such that when an imperfect self-excitation pulse modulation is applied, feedback to the laser diode 570 is provided in the configuration of FIG. 30, thus to carry out more conspicuous pulse generation.

Figure 3A:
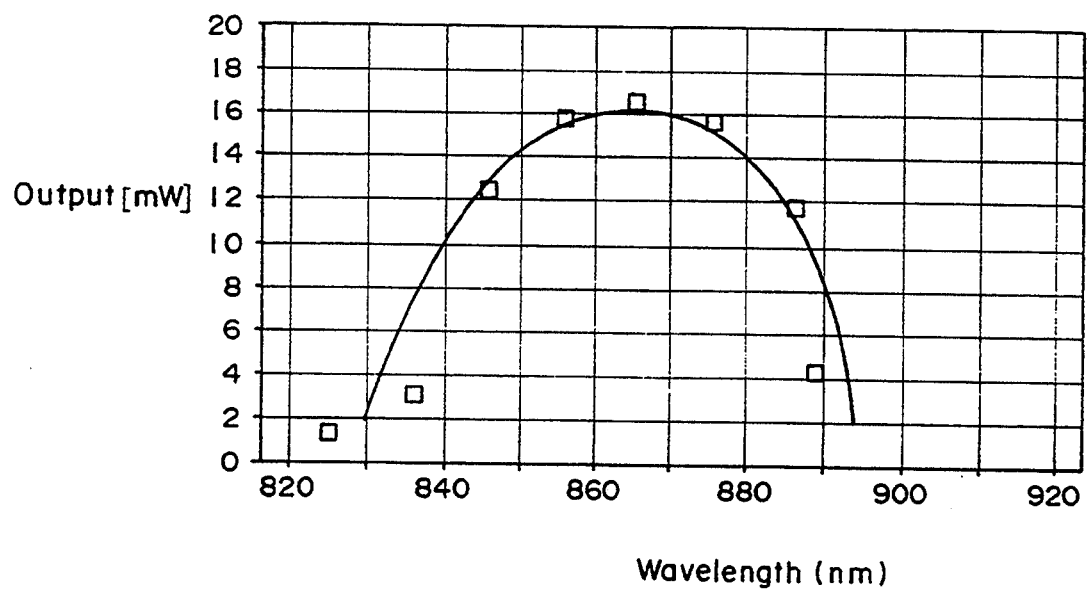
FIGS. 3A and 3B are views showing spectral output characteristics of the prior art, respectively.
Figure 3B:
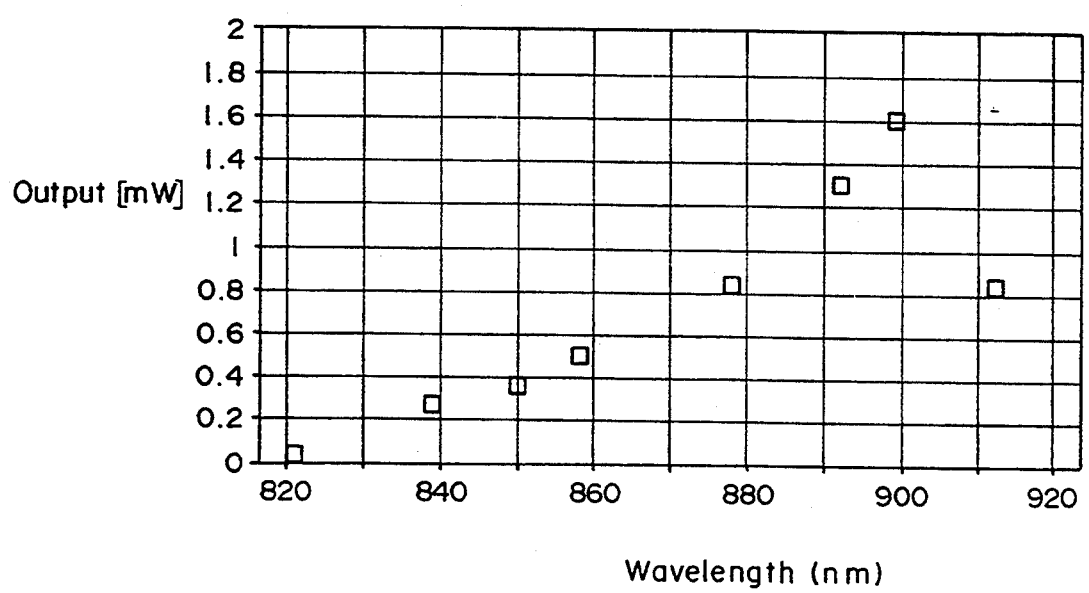

The spectral output characteristic 1 of FIG. 6 is a characteristic obtained in the case where a mirror B when the characteristic of FIG. 3B is obtained is used as a mirror serving as optical feedback means of the sub-resonator, and a mirror to which the same coating as that of the mirror B when the characteristic of FIG. 3A is obtained is applied is used as a concave mirror serving both as the main resonator mirror of the main resonator and the optical input/output port.

As stated above, since a laser output is not greatly dependent upon the spectral characteristic of the resonator mirror of the main resonator or the optical feedback means, a broad band continuous wavelength tunable laser can be constructed. Further, its output characteristic can be close to a flat characteristic. And high output can be obtained at either of both edge of the tunable wavelength range. Furthermore, the spectral band width of an output light can become equal to a value of 1-2 nm, which is narrower than that in the prior art.

In addition, since the main resonator is oscillating (resonating with amplifying) at all times, in the case where an optical output port is disposed within the sub-resonator, many beams can be taken out. One of these beams can be used for stabilization.

Finally, the effects or advantages will be summarized below in a coparative manner between the above-described embodiments and the prior art. In the case where selection of wavelength is carried out by using prism, with the devices of the embodiments, it is possible to realize a stable optical output, a broader band, and a narrower spectrum as compared to the case where a prism is provided within the main resonator as in the prior art. Further, since the main resonator is oscillating (resonating with amplifying) at all times, adjustment is simple. In the prior art, when a change of wavelength of an output light is above a wavelength variable range during experiment, resonance of the resonator may be stopped. For this reason, it takes much labor for adjustment of the device until laser resonance can be produced for a second time, giving rise to the problem that an experiment may be interrupted on the way, or similar problems. Particularly, this was big problem in the case of a laser medium having a small gain.

Further, since the main resonator can be of the simplest structure in which no optical element for selection of wavelength is included, it is possible to hold down the optical loss to a small value. Particularly, this laser device is effective in the case where the gain of the laser medium is small, or the intensity of an excitation light is small. In addition, since this device can be applied to other wavelength tunable laser devices, various applications are conceivable.

What is claimed is:

1. A wavelength tunable laser device comprising:
   a main resonator for resonating a laser beam, wherein said main resonator includes:
   at least two main resonator mirrors,
   a laser medium provided in a manner so as to be between said main resonator mirrors, and
   an optical input/output port for outputting a laser beam resonated by said main resonator mirrors and the laser medium from the inside of said main resonator to the outside thereof, and for inputting said laser beam from the outside of said main resonator to the inside thereof;
   a sub-resonator for selecting a desired wavelength of the laser beam output from said main resonator and for returning the laser beam of the desired wavelength back to said laser medium, wherein said sub-resonator includes:
   wavelength selection means for wavelength-selecting a laser beam output from said optical input/output port,
   optical feedback means for allowing the wavelength-selected laser beam to be fed back to said main resonator through said optical input/output port, and
   at least one sub-resonator mirror resonating with said optical feedback means;
   means for optically coupling said sub-resonator to said main resonator, said means collimating the laser beam output from said optical input/output port of said main resonator so as to substantially increase the amount of laser beam returned back from said sub-resonator to said main resonator;
   an optical output port for taking out the laser beam to the outside of said wavelength tunable laser device, wherein said optical output port is provided in any one of an excitation means, said mean resonator and said sub-resonator; and
   said excitation means excites said laser medium.

2. A wavelength tunable laser device according to claim 1, wherein said sub-resonator mirror is one of said main resonator mirrors or said optical input/output port.

3. A wavelength tunable laser device according to claim 1, wherein said optical input/output port is one of said main resonator mirrors.

4. A wavelength tunable laser device according to claim 3, wherein said sub-resonator is said optical input/output port doubling as said main-resonator mirrors.

5. A wavelength tunable laser device according to claim 1, wherein said excitation means includes a laser diode, and is adapted to carry out light excitation of said laser medium by making use of output light.

6. A wavelength tunable laser device according to claim 5,
   wherein said excitation means includes focusing means for focusing an excitation light to excite said laser medium within said main resonator, and
   wherein said focusing means is any one of a convex lens, a concave mirror, a parabolic reflection mirror, and a cylindrical lens.

7. A wavelength tunable laser device according to claim 3, wherein said main resonator is a Fabry-Perot type resonator or a ring resonator.

8. A wavelength tunable laser device according to claim 7, wherein said optical input/output port doubles as a function to allow said main resonator mirror to have a characteristic permitting a portion of a laser beam to be transmitted therethrough to carry out input/output of a laser beam to and from said main resonator mirror.

9. A wavelength tunable laser device according to claim 1, wherein said laser medium is a solid-state laser medium.

10. A wavelength tunable laser device according to claim 9, wherein said main resonator mirror is of a structure in which reflection coating is implemented to a solid-state laser medium.

11. A wavelength tunable laser device according to claim 1,
    wherein said wavelength selection means is any one of a transmission grating, a triangular prism and a double refraction filter, and
    wherein said optical feedback means is a total reflection mirror.

12. A wavelength tunable laser device according to claim 11, wherein said optical feedback means includes an optical fiber and a total reflection mirror.

13. A wavelength tunable laser device according to claim 1, wherein said optical feedback means includes an optical fiber.

14. A wavelength tunable laser device according to claim 1, wherein said sub-resonator is a reflection grating, and functions as both said wavelength selection means and said optical feedback means.

15. A wavelength tunable laser device according to claim 11, wherein said wavelength selection means includes at least one of a Fabry-Perot etalon and an interference filter, and is formed such that optical elements having a large number of stages are used.

16. A wavelength tunable laser device according to claim 1, wherein said optical output port is a beam splitter adapted to allow a laser beam within said main resonator or said sub-resonator to be partially reflected, thus to remove reflected light.

17. A wavelength tunable laser device according to claim 1, wherein said optical output port also functions to allow one of said main resonator mirror and said optical feedback means to have a characteristic permitting a portion of said laser beam transmitted therethrough to be output as a transmitted light.

18. A wavelength tunable laser device according to claim 1, wherein said optical output port is an optical element surface included in one of said main resonator and said sub-resonator, for utilizing rays of reflected light of said laser beam subsidiarily generated on said optical element surface.

19. A wavelength tunable laser device according to claim 1, wherein an excitation light from said excitation means passes through a triangular prism, and is then incident from one of said main resonator mirrors to said laser medium, and wherein
    said optical output port includes said triangular prism and a total reflection mirror, and said triangular prism refracts said laser beam transmitted through said one main resonator mirror and said total reflection mirror reflects the refracted laser beam to remove the reflected laser beam to the outside of said wavelength tunable laser device.

20. A wavelength tunable laser device according to claim 1, wherein when two beams are obtained as a light output in two forward and backward directions by said optical output port, one beam is caused to be reflected by a reflection mirror to output said one beam so that said one beam is superposed on the other beam 21. A wavelength tunable laser device according to claim 1,
wherein said at least two main resonator mirrors function as said sub-resonator mirror and said optical input/output port, and
wherein said main resonator and said sub-resonator are combined in a ring form.

22. A wavelength tunable laser device according to claim 1, wherein said means for optically coupling said sub-resonator to said main resonator includes any one of a collimating lens, a concave mirror and a parabolic reflection mirror for changing the output light from said optical input/output port to parallel light, disposed between said optical input/output port and said wavelength selection means.

23. A wavelength tunable laser device according to claim 1, wherein non-reflection coating is applied to at least one of respective surfaces for which reflection of elements constituting said main resonator and said sub-resonator is not required.

24. A wavelength tunable laser device according to claim 1 further comprising:
a photoelectric converter and a control unit, to obtain at least two rays of output light from said optical output port to input one of said two beams to said photoelectric converter,
whereby said control unit effects, on the basis of an output signal of said photoelectric converter, a control such that the laser beam intensity is stabilized.

25. A wavelength tunable laser device according to claim 24, wherein said control unit carries out a feedback control of an excitation energy of said excitation means on the basis of an output signal of said photoelectric converter, thus to stabilize the laser light intensity.

26. A wavelength tunable laser device according to claim 24, wherein said control unit changes, by feedback control, at least one of the resonator length of said main resonator and the resonator length of said sub-resonator on the basis of an output signal of said photoelectric converter, thus to stabilize the laser output intensity.

27. A wavelength tunable laser device comprising:
a main resonator for resonating a laser beam, said main resonator including:
at least two main resonator mirrors,
a laser medium being a solid-state laser medium including $Cr^{3+}$:LiSrAlF$_6$, said laser medium provided so as to be between said main resonator mirrors, and
an optical input/output port for outputting a laser beam resonated by said main resonator mirrors and the laser medium from the inside of said main resonator to the outside thereof, and for inputting said laser beam from the outside of said main resonator to the inside thereof;
a sub-resonator for selecting a desired wavelength of the laser beam output from said main resonator and for returning the laser beam of the desired wavelength back to said laser medium, said sub-resonator including:
wavelength selection means for wavelength-selecting a laser beam output from said optical input/output port,
optical feedback means for allowing the wavelength-selected laser beam to be fed back to said main resonator through said optical input/output port, and
at least one sub-resonator mirror resonating with said optical feedback means;
an optical output port for removing the laser beam to the outside of said wavelength tunable laser device, said optical output port provided in any one of an excitation means, said main resonator and said sub-resonator; and
wherein said excitation means excites said laser medium.

28. A wavelength tunable laser device according to claim 27 further comprising means for optically coupling said sub-resonator to said main resonator, said coupling means collimating the laser beam output from said optical input/output port of said main resonator so as to substantially increase an amount of the laser beam returned from said sub-resonator to said main resonator.

29. A wavelength tunable laser device according to claim 28, wherein said means for optically coupling said sub-resonator to said main resonator includes any one of a collimating lens, a concave mirror and parabolic reflection mirror for changing the output light output from said optical input/output port to a parallel light, disposed between said optical input/output and said wavelength selection means.

30. A wavelength tunable laser device comprising:
a main resonator for resonating a laser beam, said main resonator including;
at least two main resonator mirrors,
a laser medium provided so as to be between said main resonator mirrors, and
an optical input/output port for outputting a laser beam resonated by said main resonator mirrors and the laser medium from the inside of said main resonator to the outside thereof, and for inputting the laser beam from the outside of said main resonator to the inside thereof;
a sub-resonator for selecting a desired wavelength of the laser beam output from said main resonator and for returning the laser beam of the desired wavelength back to said laser medium, said sub-resonator including:
wavelength selection means for wavelength-selecting a laser beam output from said optical input/output port,
optical feedback means for allowing the wavelength-selected laser beam to be fed back to said main resonator through said optical input/output port, said optical feedback means including a phase conjugate wave generation crystal, and
at least one sub-resonator mirror resonating with said optical feedback means;
an optical output port for removing the laser beam to the outside of said wavelength tunable laser device, said optical output port provided in any one of excitation means, said main resonator and said sub-resonator; and
wherein said excitation means excites said laser medium.

31. A wavelength tunable laser device according to claim 30 further comprising means for optically coupling said sub-resonator to said main resonator, said means collimating the laser beam output from said optical input/output port of said main resonator so as to substantially increase the amount of the laser beam returned from said sub-resonator to said main resonator.

32. A wavelength tunable laser device according to claim 31, wherein said means for optically coupling said sub-resonator to said main resonator includes any one of a collimating lens, a concave mirror and parabolic reflection mirror for changing the output light output from said optical input/output port to a parallel light, disposed between said optical input/output port and said wavelength selection means.

33. A wavelength tunable laser device comprising:
a main resonator for resonating a laser beam, said main resonator including;
at least two main resonator mirrors,
a laser medium provided so as to be between said main resonator mirrors, and
an optical input/output port for outputting a laser beam resonated by said main resonator mirrors and the laser medium from the inside of said main resonator to the outside thereof, and for inputting the laser beam from the outside of said main resonator to the inside thereof;
a sub-resonator for selecting a desired wavelength of the laser beam output from said main resonator and for returning the laser beam of the desired wavelength to said laser medium, said sub-resonator including:
wavelength selection means for wavelength-selecting a laser beam output from said optical input/output port,
optical feedback means for allowing the wavelength-selected laser beam to be fed back to said main resonator through said optical input/output port,
at least one sub-resonator mirror resonating with said optical feedback means, and
a modulation unit for applying amplitude at an integer multiple of a frequency interval between longitudinal modes, wherein a resonator length of said sub-resonator is set to one of a multiple of the integer and one divided by the integer of the resonator length of said main resonator;
an optical output port for removing the laser beam to the outside of said wavelength tunble laser device, said optical output port provided in any one of excitation means, said main resonator and said sub-resonator; and
wherein said excitation means excites said laser medium.

34. A wavelength tunable laser device according to claim 33, wherein said laser medium is an A-O element, and
wherein said modulation unit is connected to said laser medium.

35. A wavelength tunable laser device according to claim 33, wherein said laser device carriers out a self-excitation mode lock including a Kerr lens mode lock by making use of optical non-linearity of said laser medium.

36. A wavelength tunable laser device according to claim 33, wherein said sub-resonator mirror also functions as said main resonator mirror and is an A–O element of a transparent optical medium, and wherein said modulation unit is connected to said A–O element.

37. A wavelength tunable laser device according to claim 33, wherein a dispersion medium is used as said optical feedback means to carry out self-excitation mode lock by making use of interference of light.

38. A wavelength tunable laser device according to claim 37, wherein said dispersion medium is an optical fiber to carry out an additive pulse mode lock.

39. A wavelength tunable laser device according to claim 33 further comprising means for optically coupling said sub-resonator to said main resonator, said coupling means collimating the laser beam output from said optical input/output port of said main resonator so as to substantially increase the amount of laser beam returned from said sub-resonator to said main resonator.

40. A wavelength tunable laser device according to claim 39, wherein said means for optically coupling said sub-resonator to said main resonator includes any one of a collimating lens, a concave mirror and a parabolic reflection mirror for changing the output light output from said optical input/output port to a parallel light, disposed between said optical input/output port and said wavelength selection means.

* * * * *